(12) United States Patent
Ono

(10) Patent No.: US 8,817,105 B2
(45) Date of Patent: *Aug. 26, 2014

(54) INFORMATION TERMINAL, AND METHOD AND PROGRAM FOR RESTRICTING EXECUTABLE PROCESSING

(71) Applicant: Kyocera Corporation, Kyoto (JP)

(72) Inventor: Koji Ono, Higashi Osaka (JP)

(73) Assignee: Kyocera Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/850,070

(22) Filed: Mar. 25, 2013

(65) Prior Publication Data

US 2013/0287266 A1   Oct. 31, 2013

Related U.S. Application Data

(63) Continuation of application No. 12/091,111, filed as application No. PCT/JP2006/320048 on Oct. 6, 2006, now Pat. No. 8,427,541.

(30) Foreign Application Priority Data

Oct. 25, 2005   (JP) .................................. 2005-309303

(51) Int. Cl.
*H04N 7/18*   (2006.01)

(52) U.S. Cl.
USPC ............................ 348/161; 713/185; 382/209

(58) Field of Classification Search
CPC .. H04L 63/0861; H04W 12/06; H04W 12/08; G07C 9/00563; H04N 7/183
USPC ............................................................ 726/1
See application file for complete search history.

(56) References Cited

U.S. PATENT DOCUMENTS

| 6,907,408 B2 | 6/2005 | Angel |
| 7,551,945 B2 | 6/2009 | Okada et al. |

(Continued)

FOREIGN PATENT DOCUMENTS

| JP | 10-055470 | 2/1998 |
| JP | 2001-312469 | 11/2001 |
| JP | 2002-132732 | 5/2002 |
| JP | 2003-169371 | 6/2003 |
| JP | 2003-242492 A | 8/2003 |
| JP | 2004-288124 A | 10/2004 |
| JP | 2005-026730 | 1/2005 |
| JP | 2005-115485 | 4/2005 |
| JP | 2005-123817 | 5/2005 |

OTHER PUBLICATIONS

"IC Card no Rival ka Kyozonka!? Biometrics no Kanosei o Saguru Smart Wireless Web Camera de Personal Computer no Log in Ninsho o Jisshi Fusei Access Taisaku mo Banzen no Security Solution," CardWave, Jun. 18, 2004, C.media Co., Ltd., 17(7):17.
International Search Report issued on Dec. 12, 2006 in corresponding International Patent Application No. PCT/JP2006/320048.
Office Action issued May 17, 2011 in corresponding Japanese Patent Application No. 2005-309303.

*Primary Examiner* — Dustin Nguyen
(74) *Attorney, Agent, or Firm* — Duane Morris LLP

(57) ABSTRACT

An apparatus and method for restricting executable processing carried out in an information terminal, the method including: accepting an operation by an operator; in response to the accepted operation, executing processing corresponding to the operation; requesting an input of identification information; performing authentication of the identification information input in response to the request; in the case where an input of identification information is requested in the identification information requesting step, acquiring image data; storing the acquired image data; extracting an area including an image recognized as a person from the acquired image data; enabling execution of processing and deletion of the image data when an authentication succeeds and preventing deletion of the image data when the authentication fails.

5 Claims, 3 Drawing Sheets

(56) References Cited

U.S. PATENT DOCUMENTS

| | | |
|---|---|---|
| 7,702,314 B2 | 4/2010 | Kang |
| 8,635,661 B2 * | 1/2014 | Shahbazi ................ 726/1 |
| 2002/0152390 A1 | 10/2002 | Furuyama et al. |
| 2004/0071322 A1 | 4/2004 | Choshi et al. |
| 2005/0203854 A1 | 9/2005 | Das et al. |
| 2005/0210267 A1 | 9/2005 | Sugano et al. |
| 2005/0270386 A1 | 12/2005 | Saitoh et al. |
| 2007/0024698 A1 | 2/2007 | Engstrom et al. |
| 2007/0072581 A1 | 3/2007 | Aerrabotu |
| 2007/0143824 A1 | 6/2007 | Shahbazi |
| 2007/0242887 A1 | 10/2007 | Matsushita et al. |

* cited by examiner

INFORMATION TERMINAL, AND METHOD AND PROGRAM FOR RESTRICTING EXECUTABLE PROCESSING

This application is a continuation of application Ser. No. 12/091,111, filed Apr. 22, 2008, which is a 371 application of International Patent Application No. PCT/JP2006/320048, filed Oct. 6, 2006, and which claims priority to Japanese Patent Application No. 2005-309303, filed Oct. 25, 2005, all of which are incorporated herein by reference in their entireties.

TECHNICAL FIELD

The present invention relates to an information terminal, and a method and program for restricting executable processing. More specifically, the present invention relates to an information terminal provided with the function of authenticating an operator, and a method and program for restricting executable processing carried out in the information terminal.

BACKGROUND ART

Many of the mobile phones recently on the market are provided with the function of locking the phone so as not to accept key operations by others. The lock of the mobile phone is not released unless a right password is input. However, the password is often a combination of a plurality of numbers, and if someone repeatedly tries the combination of numbers, the one the same as the password may be obtained. Once the lock of the mobile phone is released by another person, the mobile phone may be used by the other person without the owner of the phone knowing it, and the information stored in the mobile phone may be revealed to the other person.

Japanese Patent Laid-Open No. 2004-288124 (Patent Document 1) discloses an information processing apparatus which uses a password for authentication of the user of a vehicle, and picks up an image of the user based on the authentication result of the password. The information processing apparatus described in Japanese Patent Laid-Open No. 2004-288124 is capable of picking up an image of the user who input a wrong password. However, if the user knows that the image is to be picked up, the user may input the password without entering into the image pickup range, in which case the image obtained will not include the figure of the user. Therefore, the user may be able to try a plurality of passwords without his/her image picked up, to finally find out the authentic password.

[Patent Document 1] Japanese Patent Laid-Open No. 2004-288124

DISCLOSURE OF THE INVENTION

Problems to be Solved by the Invention

The present invention has been accomplished to solve the above-described problems, and an object of the present invention is to provide an information terminal and a method and program for restricting executable processing which are capable of eliminating an unauthorized action trying to find out authentication information.

Another object of the present invention is to provide an information terminal and a method and program for restricting executable processing which are capable of preventing the information terminal from being used by others.

Means for Solving the Problems

To achieve the above-described objects, according to an aspect of the present invention, an information terminal includes: an accepting portion to accept an operation by an operator; a processing execution portion to execute processing corresponding to the operation in response to the operation accepted by the accepting portion; an identification information requesting portion to request an input of identification information for identification of the operator; an authentication portion to perform authentication of the identification information input in response to the request by the identification information requesting portion; an image pickup portion arranged in a position where the operator is included in an image pickup range and to output image data obtained by picking up an image; an image data acquiring portion to activate the image pickup portion to acquire the image data when the identification information requesting portion requests an input of the identification information; an area extracting portion to extract an area including an image recognized as a person from the acquired image data; and an enabling portion to enable execution of processing by the processing execution portion in the case where a first condition that authentication by the authentication portion succeeds and a second condition that the area including an image recognized as a person is extracted from the image data by the area extracting portion are both satisfied.

According to this invention, an input of identification information is requested, and the identification information input in response to the request is authenticated. When the input of the identification information is requested, the image data picked up and output by an image pickup portion is acquired, and the area including an image recognized as a person is extracted from the acquired image data. The image pickup portion is arranged in the position including the operator within its image pickup range, so that the image data output from the image pickup portion includes the area where the operator is recognized. An operation by the operator is accepted, and processing corresponding to the operation is carried out in response to the accepted operation, only when the first condition that authentication succeeds and the second condition that the area including an image recognized as a person is extracted from the image data are both satisfied. Even if the identification information input is authenticated, if the image of the operator is not picked up by the image pickup portion, the processing corresponding to the operation is not carried out. This means that, even if the operator inputs identification information trying to find out the authentication information, if the image of the operator is not picked up by the image pickup portion, the operator cannot determine whether the identification information was authenticated or not. As a result, it is possible to provide an information terminal capable of eliminating an unauthorized action trying to find out the authentication information. Further, for the processing corresponding to the operation to be carried out, the area including an image recognized as a person needs to be extracted from the image data obtained by picking up an image of the operator, in addition to success in authentication of the identification information. As such, the processing that is executed is restricted to the processing based on the operation by an authorized operator who knows the authentication information. As a result, it is possible to provide an information terminal capable of preventing the information terminal from being used by others.

Preferably, the information terminal further includes an image data transmitting portion to transmit the image data to a predetermined destination when the authentication by the authentication portion failed.

According to this invention, when the authentication failed, the image data is transmitted to a predetermined destination. Since the image pickup portion is arranged in the position where the operator is included in its image pickup range, the image data output from the image pickup portion may include the area having the operator recognized therein. This enables notification of the event that the information terminal was operated by an unauthorized person, and also enables specification of the unauthorized person with the image data obtained by picking up the image.

Preferably, the information terminal further includes: an image data storage portion to store the image data acquired by the image data acquiring portion; and a deleting portion to delete the image data from the image data storage portion when the authentication by the authentication portion succeeded.

According to this invention, while the acquired image data is stored, the image data is deleted once the authentication succeeded. In the case where the authentication succeeded and the area including an image recognized as a person is extracted from the image data, it is highly likely that the operator is an authorized person. In the case where the authentication succeeded and the area including an image recognized as a person is not extracted from the image data, the image data would not include the information for specifying the unauthorized person. Thus, the image data is deleted when the authentication succeeded. This prevents unnecessary image data from being stored, and thus ensures effective use of the storage resource.

Preferably, the information terminal further includes a history information storage portion to store history information including at least a date and time in response to a request by the identification information requesting portion.

According to this invention, the history information including at least the date and time is stored. The history information stored allows the owner of the information terminal to know that an unauthorized operation was made, from the history information including the date and time when the owner did not input his/her own identification information. This also allows the owner to know that the authentication information may have been revealed to another person.

Preferably, the image pickup portion includes a notification portion to notify that an image is picked up, and a notification prohibiting portion to prohibit notification by the notification portion when the image pickup portion is activated by the image data acquiring portion.

According to this invention, notification that an image is picked up is not issued, which allows an image to be picked up without being noticed by the operator.

According to another aspect of the present invention, a method for restricting executable processing is carried out in an information terminal having an image pickup portion arranged in a position where an operator is included in an image pickup range and outputting image data obtained by picking up an image, wherein the method includes the steps of: accepting an operation by an operator; executing processing corresponding to the operation in response to the accepted operation; requesting an input of identification information; performing authentication of the identification information input in response to the request; in the case where an input of identification information is requested in the identification information requesting step, activating the image pickup portion to acquire image data; extracting an area including an image recognized as a person from the acquired image data; and enabling execution of processing by the processing executing step in the case where a first condition that authentication in the authentication step succeeds and a second condition that the area including an image recognized as a person is extracted from the image data in the area extracting step are both satisfied.

According to this invention, it is possible to provide a method for restricting executable processing capable of eliminating an unauthorized action trying to find out authentication information. It is also possible to provide a method for restricting executable processing capable of preventing the information terminal from being used by others.

According to a further aspect of the present invention, a program for restricting executable processing is carried out in an information terminal having an image pickup portion arranged in a position where an operator is included in an image pickup range and outputting image data obtained by picking up an image, wherein the program causes the information terminal to execute processing including the steps of: accepting an operation by an operator; executing processing corresponding to the operation in response to the accepted operation; requesting an input of identification information; performing authentication of the identification information input in response to the request; in the case where an input of identification information is requested in the identification information requesting step, activating the image pickup portion to acquire image data; extracting an area including an image recognized as a person from the acquired image data; and enabling execution of processing by the processing executing step in the case where a first condition that authentication in the authentication step succeeds and a second condition that the area including an image recognized as a person is extracted from the image data in the area extracting step are both satisfied.

According to this invention, it is possible to provide a program for restricting executable processing capable of eliminating an unauthorized action trying to find out authentication information. It is also possible to provide a program for restricting executable processing capable of preventing the information terminal from being used by others.

DESCRIPTION OF REFERENCE CHARACTERS

Figure 1:
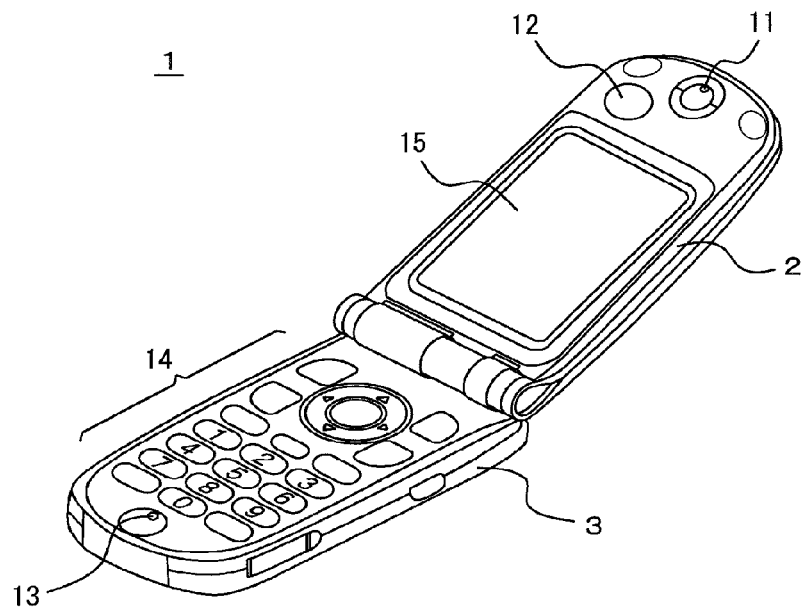
FIG. 1 is a perspective view of a mobile phone according to an embodiment of the present invention.

1: mobile phone; 2: display side portion; 3: operation side portion; 11: speaker; 12: camera; 13: microphone; 14: operation keys; 15: LCD; 21: control portion; 23: antenna; 25: radio circuit; 29: memory; 31: codec portion; 40: flash memory; 51: identification information requesting portion; 53: authentication portion; 55: image acquiring portion; 57: area extracting portion; 59: image data erasing portion; 61: mode switching portion; 63: image data transmitting portion; and 65: processing execution portion.

BEST MODES FOR CARRYING OUT THE INVENTION

Embodiments of the present invention will now be described with reference to the drawings. In the following description, like reference characters denote like parts, which have like names and functions, and therefore, detailed description thereof will not be repeated.

FIG. 1 is a perspective view of a mobile phone according to an embodiment of the present invention. Referring to FIG. 1, a mobile phone 1 includes an operation side portion 3 and a display side portion 2. Operation side portion 3 and display side portion 2 are rotatably connected via a hinge mechanism. Thus, mobile phone 1 may take the closed state where the inner surface of operation side portion 3 faces the inner surface of display side portion 2, and the open state where the user is capable of viewing the inner surfaces of operation side portion 3 and display side portion 2 at the same time. FIG. 1 shows mobile phone 1 in the open state. Operation keys 14 including ten keys, a talk key and others and a microphone 13 are arranged on the inner surface of operation side portion 3. A liquid crystal display (LCD) 15, a speaker 11 and a camera 12 are arranged on the inner surface of display side portion 2. At the time when an operator of mobile phone 1 operates the operation keys, mobile phone 1 is in the open state. Camera 12 is arranged in the position where the image pickup direction of camera 12 is in the direction of the face of the operator of mobile phone 1 when mobile phone 1 is in the open state. It is preferable that the field angle of camera 12 is as large as possible, so that the face of the operator of mobile phone 1 is within the image pickup range. Camera 12 is arranged in mobile phone 1 and its field angle is adjusted in such a manner that when mobile phone 1 is in the open state where the operator is capable of operating it, at least the face of the operator of mobile phone 1 is included in the image pickup range of camera 12.

Figure 2:
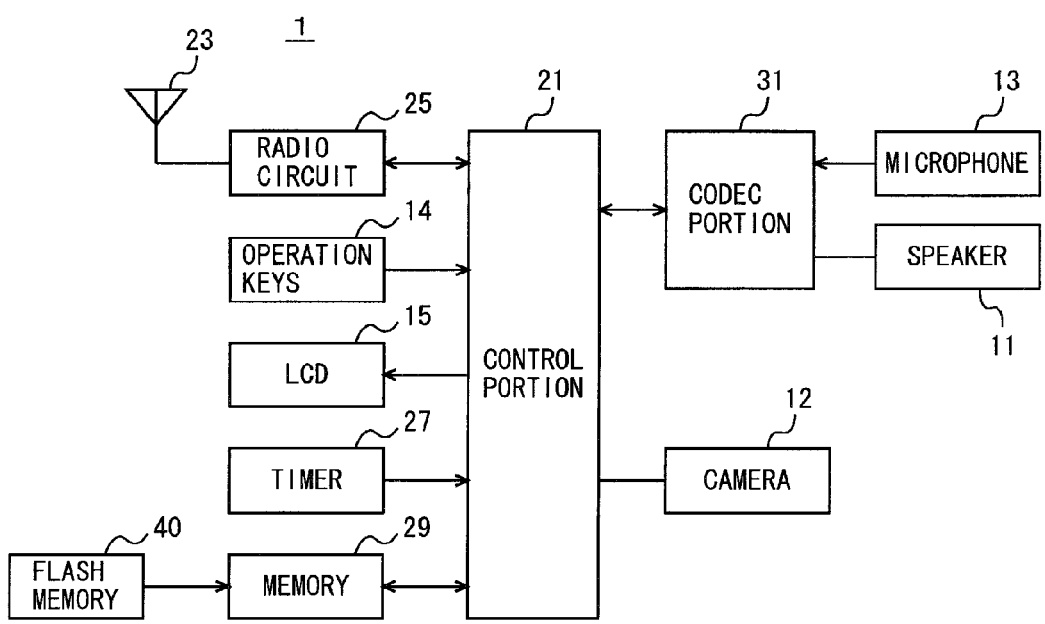
FIG. 2 is a circuit diagram of the mobile phone according to the embodiment.

FIG. 2 is a circuit diagram of the mobile phone according to the present embodiment. Referring to FIG. 2, mobile phone 1 includes a control portion 21 which is responsible for overall control of mobile phone 1, a radio circuit 25 having an antenna 23 connected thereto, operation keys 14 which accept an input of a user's operation, an LCD 15, a memory 29 which stores authentication information, a program to be executed by control portion 21 and the like, a camera 12, a codec portion 31 which processes audio data, and a microphone 13 and a speaker 11 which are connected to codec portion 31.

Radio circuit 25 receives a radio signal received by antenna 23, and outputs an audio signal obtained by demodulating the radio signal to codec portion 31. Further, radio circuit 25 receives an audio signal from codec portion 31, and outputs a radio signal obtained by modulating the audio signal to antenna 23. Codec portion 31 decodes an audio signal input from radio circuit 25, converts the decoded, digital audio signal to an analog signal, and amplifies it for output to speaker 11. Further, codec portion 31 receives an analog audio signal from microphone 13, converts the audio signal to a digital signal, encodes it, and outputs the encoded audio signal to radio circuit 25.

Camera 12, controlled by control portion 21, picks up an image in accordance with an instruction from control portion 21, and outputs obtained image data to control portion 21. Camera 12 is provided with a lens and a photoelectric conversion element such as a CCD (Charge Coupled Device). The lens collects light and focuses it onto the CCD, and the CCD performs photoelectric conversion of the received light, to output image data. Camera 12 includes an image processing circuit which carries out image processing to improve image quality of the photoelectrically converted image data, an A/D converter circuit which converts the image data from analog to digital form, and a coding circuit which reduces the data amount of the image data. Control portion 21 outputs an instruction to camera 12 to pick up an image and, at the same time, notifies the operator that an image is picked up. The notification may be an output of a shutter or other sound, firing of a flash of light, or a combination thereof.

Memory 29 includes a ROM (Read Only Memory) which stores a program for restricting executable processing which is carried out by control portion 21, and an EEPROM (Electronically Erasable and Programmable ROM) which stores authentication information, authentication history information, image data, and transmission destination information, which will be described later, in a non-volatile manner. Further, the EEPROM of memory 29 stores various kinds of personal information input by the operator of mobile phone 1. The personal information includes, e.g., telephone directory data, originating number history, incoming number history, transmitted e-mails, and received e-mails. Although the case where the program for restricting executable processing carried out by control portion 21 is stored in the ROM of memory 29 is explained here, the program for restricting executable processing may be stored in a flash memory 40 and read from flash memory 40 to be carried out by control portion 21. The recording medium for storing the program for restricting executable processing is not restricted to flash memory 40. It may be a flexible disk, a cassette tape, an optical disk (MO (Magnetic Optical Disc), MD (Mini Disc), DVD (Digital Versatile Disc)), an IC card (including a memory card), an optical card, or a semiconductor memory such as a masked ROM, an EPROM, an EEPROM, or the like. Still alternatively, mobile phone 1 may be connected to the Internet via radio circuit 25 and the program for restricting executable processing may be downloaded from a computer connected to the Internet, to be carried out by control portion 21. As used herein, the "program" includes, not only the program directly executable by control portion 21, but also a program in the form of a source program, a compressed program, an encrypted program, and others.

Mobile phone 1 according to the present embodiment is provided with the lock function for the owner of mobile phone 1 to prohibit the use of the mobile phone by others. The owner of mobile phone 1 sets mobile phone 1 to either the state where the lock function is effective or the state where the lock function is ineffective. If an operation is input to operation keys 14 in the state where the lock function is set ineffective, mobile phone 1 accepts the input of the operation and carries out processing in accordance with the accepted operation. In the state where the lock function is set effective, mobile phone 1 is either in the enable mode or in the disable mode. Mobile phone 1 is in the disable mode for example in the initial state after the power is turned on. If an operation is input to operation keys 14 in the disable mode, mobile phone 1 does not accept the input of the operation. Thus, mobile phone 1 does not carry out the processing in response to the input operation when it is in the disable mode. Mobile phone 1 in the state of disable mode makes a transition from the disable mode to the enable mode if two conditions as will be described later are satisfied. If an operation is input to operation keys 14 when mobile phone 1 is in the enable mode, mobile phone 1 accepts the input of the operation, and carries out processing in response to the accepted operation. Mobile phone 1 in the state of enable mode makes a transition from the enable mode to the disable mode for example when an end key is depressed or when the power is turned off.

The lock function may be configured to be set effective to all or part of the processing carried out by mobile phone 1. For example, the lock function may be set effective to each of the processing of: accessing personal information stored by mobile phone 1 in memory 29, originating a call, connecting to the Internet, and others. The access to the personal information includes reading, changing, and deleting the personal information.

Figure 3:
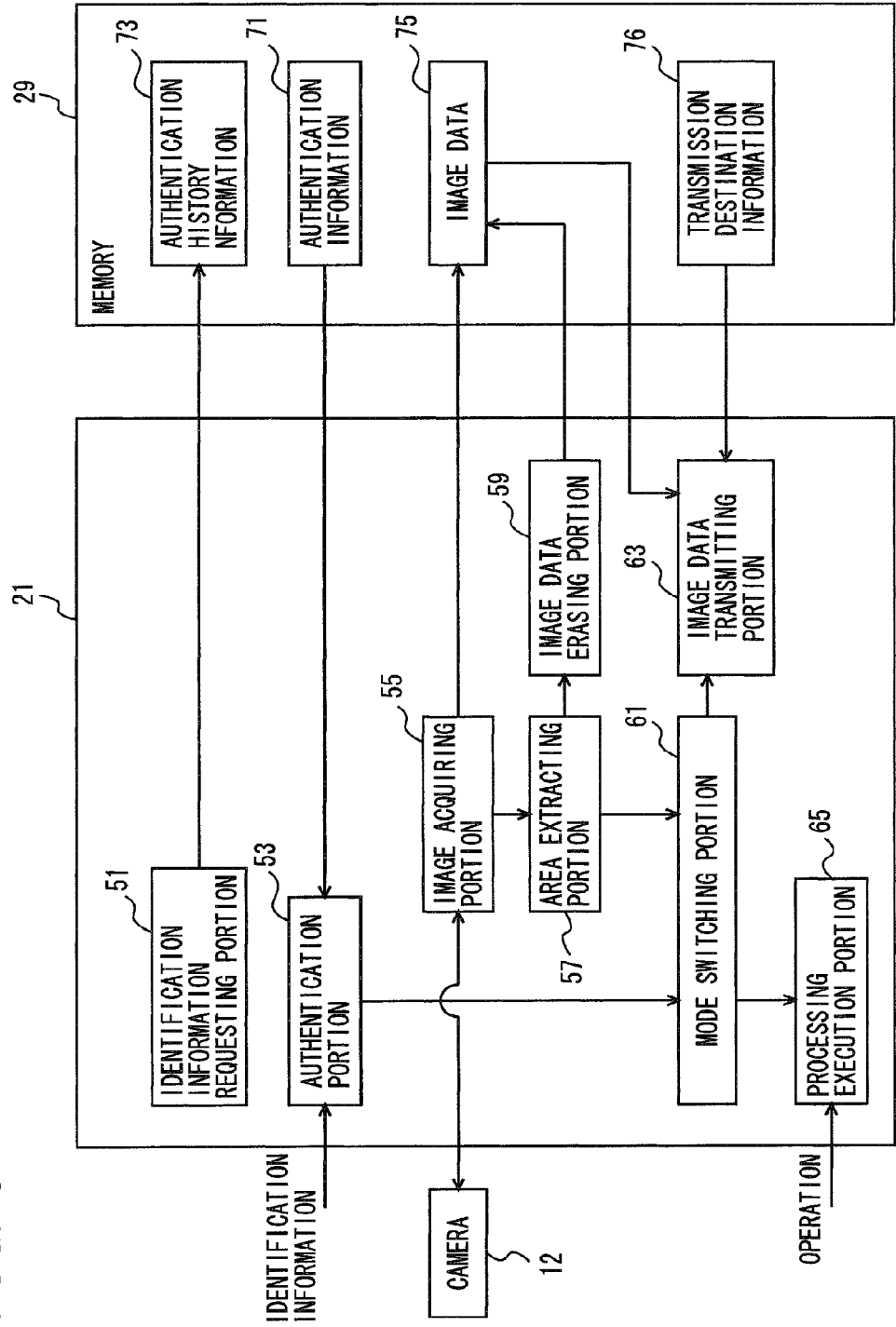
FIG. 3 is a functional block diagram showing the function of a control portion.

FIG. 3 is a functional block diagram showing the function of the control portion. Referring to FIG. 3, control portion 21 includes: an identification information requesting portion 51 which requests an operator to input identification information for identification of the user; an authentication portion 53 which accepts identification information input to operation keys 14 for authentication; an image acquiring portion 55 which activates camera 12 to acquire and store image data in memory 29; an area extracting portion 57 which extracts a prescribed area from image data; an image data erasing portion 59 which erases image data stored in memory 29; a mode switching portion 61 which switches the state of mobile phone 1 between the enable mode and the disable mode; an image data transmitting portion 63 which transmits image data to a predetermined destination; and a processing execution portion 65 which executes processing in response to the operation input to operation keys 14.

The EEPROM of memory 29 of mobile phone 1 prestores authentication information 71 and transmission destination information 76. Here, authentication information 71 is a password which is a combination of numbers. The owner of mobile phone 1 determines and inputs the password to mobile phone 1. As such, only the owner of mobile phone 1 knows the password, which is used for identification of the owner. Transmission destination information 76 is an address on the network associated with the owner of mobile phone 1, which is preferably an address other than the address on the network assigned to mobile phone 1. Here, transmission destination information 76 is an e-mail address other than the e-mail address assigned to mobile phone 1. Transmission destination information 76 may be the positional information on the network assigned to a storage device of a computer connected to the network, which may be a URL (Uniform Resource Locator) or IP (Internet Protocol) address. In order to set mobile phone 1 to the state where the lock function is effective, authentication information 71 and transmission destination information 76 need to be stored in memory 29. It is possible to set mobile phone 1 to the state where the lock function is effective on the condition that memory 29 stores both authentication information 71 and transmission destination information 76. Thus, when the operator of mobile phone 1 inputs to mobile phone 1 an operation for setting the lock function effective, mobile phone 1 attains the state where the lock function is effective if authentication information 71 and transmission destination information 76 are stored in memory 29. By comparison, when the operator of mobile phone 1 inputs to mobile phone 1 the operation for setting the lock function effective, and if authentication information 71 and transmission destination information 76 are not stored in memory 29, mobile phone 1 requests the operator to input authentication information 71 and transmission destination information 76, and when they are input, it stores them in the EEPROM of memory 29, and then attains the state where the lock function is effective. Although the example where authentication information 71 and transmission destination information 76 are required to be stored in memory 29 for setting mobile phone 1 to the state where the lock function is effective is explained here, all that is needed to set mobile phone 1 to the state where the lock function is effective is that memory 29 stores at least authentication information 71.

When the operator depresses one of operation keys 14 in the state where the lock function of mobile phone 1 is set effective and mobile phone 1 is in the disable mode, identification information requesting portion 51 requests the operator to input identification information. The identification information is information for identification of the operator, which is here a password. The operator of mobile phone 1 is notified that an input of the identification information is necessary. Specifically, identification information requesting portion 51 causes LCD 15 to display an input screen for inputting the identification information. At the time when identification information requesting portion 51 requests the operator to input the identification information, it also generates authentication history information 73 including at least the date and time when it requested the input, and stores the generated information in the EEPROM of memory 29. Authentication history information 73 is the record indicating that there was an input of an operation for causing mobile phone 1 to make a transition from the disable mode to the enable mode.

Authentication portion 53 acquires the identification information for authentication. When the operator of mobile phone 1 inputs the identification information through operation keys 14, authentication portion 53 acquires the identification information. Authentication portion 53 compares the acquired identification information with authentication information 71 stored in the EEPROM of memory 29 for authentication of the identification information. Authentication portion 53 outputs a result of authentication to mode switching portion 61. If the identification information and authentication information 71 match, authentication portion 53 authenticates the identification information and outputs the authentication result indicating that the authentication succeeded to mode switching portion 61. If they do not match, authentication portion 53 does not authenticate the identification information and outputs the authentication result indicating that the authentication failed to mode switching portion 61.

Image acquiring portion 55 activates camera 12. In response, camera 12 outputs image data obtained by picking up an image within an image pickup range. Image acquiring portion 55 acquires the image data output from camera 12. In the case where image acquiring portion 55 activates camera 12 after identification information requesting portion 51 requests the operator to input identification information, image acquiring portion 55 outputs the acquired image data to area extracting portion 57 and stores image data 75 in the EEPROM of memory 29. Image acquiring portion 55 includes a notification portion to notify the operator that an image is to be picked up, and a prohibition portion to prohibit the notification by the notification portion. When image acquiring portion 55 activates camera 12, the notification portion notifies the operator that camera 12 has been activated. However, in the case where it activates camera 12 following the issuance of a request to input identification information to the operator by identification information requesting portion 51, the prohibition portion prohibits the notification by the notification portion. The image data acquired by image acquiring portion 55 is not limited to a still image, but may be a moving image.

Area extracting portion 57 receives image data from image acquiring portion 55, and extracts a prescribed area from the image data. The prescribed area is the area including an image recognized as a person. To extract the prescribed area, any of well-known methods for extracting an area including an image recognized as a person from image data may be used, such as the method of extracting an area of flesh color, the method of extracting the shape of face, eye, nose, mouth or the like of the person from the edges included in the image data, and the method of extracting feature points of face from the image data. What is required for the processing of extracting a prescribed area carried out by area extracting portion 57 is to extract the area including an image recognized as a person from the image data and determine that the image data includes the area including an image recognized as a person;

it is unnecessary to identify the person whose image was recognized in the image data. In the case where the image data input from image acquiring portion 55 is a moving image, area extracting portion 57 selects a predetermined number of frames from a plurality of frames included in the image data, and extracts the prescribed area from the selected frames. The possibility that the prescribed area can be extracted increases with the plurality of frames.

Image acquiring portion 55 outputs a result of extraction, indicating whether the extraction succeeded or not, to mode switching portion 61 and image data erasing portion 59. If the prescribed area is extracted from the image data, area extracting portion 57 outputs the extraction result indicating that the extraction succeeded. If the prescribed area is not extracted from the image data, it outputs the extraction result indicating that the extraction failed. When the extraction result indicating that extraction failed is input from area extracting portion 57, image data erasing portion 59 erases image data 75 from the EEPROM of memory 29.

Mode switching portion 61 receives the authentication result from authentication portion 53 and the extraction result from area extracting portion 57. In the case where the authentication result indicates that the authentication succeeded and the extraction result indicates that the extraction succeeded, mode switching portion 61 switches the state of mobile phone 1 from the disable mode to the enable mode. If the authentication result indicates that the authentication failed, mode switching portion 61 outputs to image data transmitting portion 63 an instruction to transmit image data. In receipt of the instruction to transmit image data from mode switching portion 61, image data transmitting portion 63 reads image data 75 and transmission destination information 76 from the EEPROM of memory 29. Then, image data transmitting portion 63 generates an e-mail having image data 75 as its attached data and transmission destination information 76 as its destination, and transmits the generated e-mail.

Further, mode switching portion 61 outputs the state of mobile phone 1 to processing execution portion 65. The state of mobile phone 1 is either the enable mode or the disable mode. When an operation is input to operation keys 14, processing execution portion 65 acquires the operation. In the case where mobile phone 1 is in the enable mode, processing execution portion 65 executes the processing in response to the acquired operation. If mobile phone 1 is in the disable mode, processing execution portion 65 does not execute the processing in response to the acquired operation.

Figure 4:
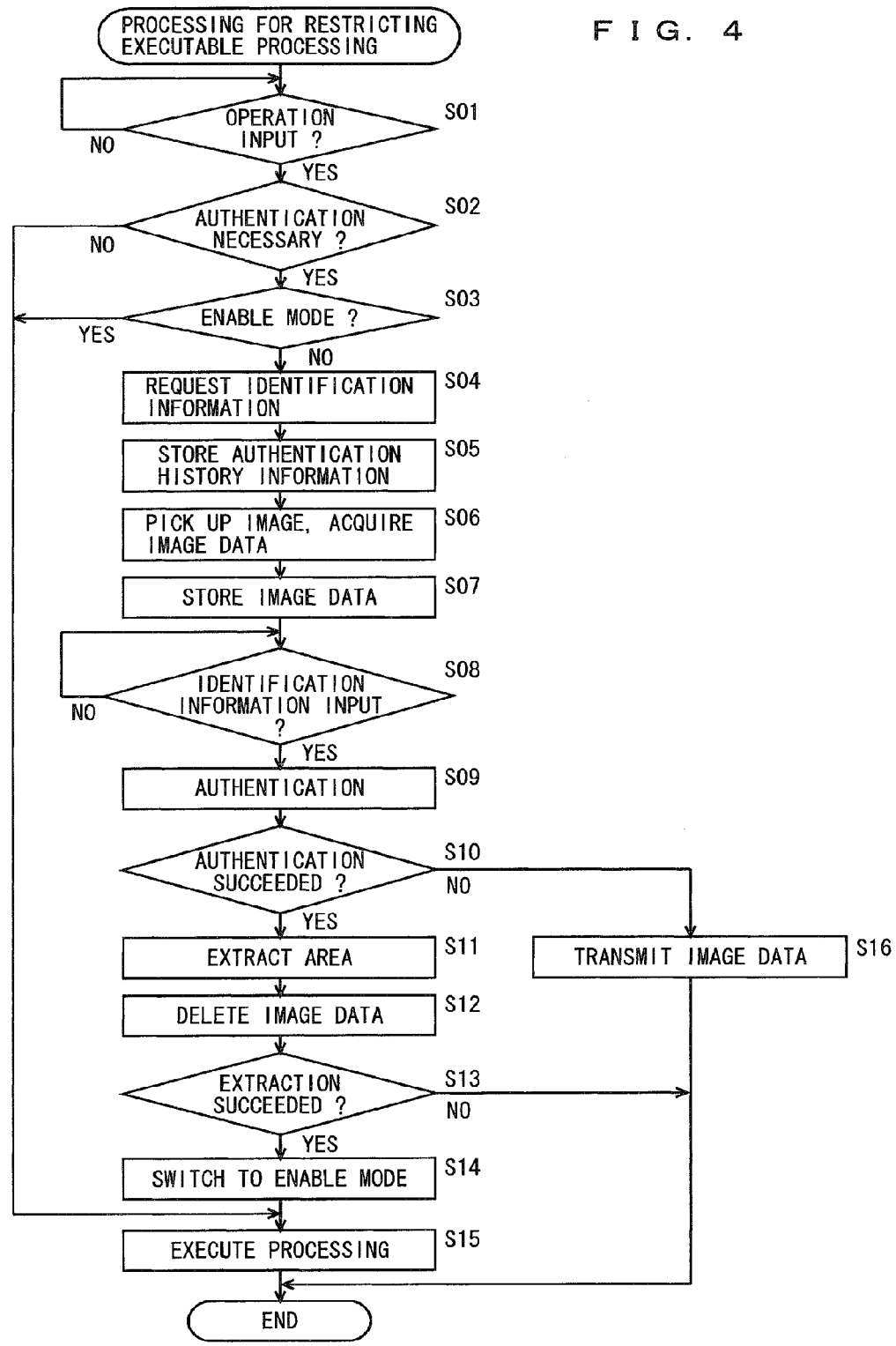
FIG. 4 is a flowchart illustrating an example of the flow of processing for restricting executable processing which is carried out in the mobile phone according to the embodiment.

FIG. 4 is a flowchart illustrating an example of the flow of processing for restricting executable processing which is carried out in the mobile phone according to the present embodiment. This processing for restricting executable processing is carried out by control portion 21 as it executes a program for restricting executable processing. Referring to FIG. 4, control portion 21 determines whether an operation has been input (step S01). The operation is input to mobile phone 1 by the operator who is operating mobile phone 1. When the operator inputs an operation to operation keys 14, control portion 21 acquires the operation. Control portion 21 is in a standby mode until an operation is input to operation keys 14 (NO in step S01), and once the operation is input to operation keys 14, it moves the process to step S02. In step S02, control portion 21 determines whether authentication is necessary. If the lock function of mobile phone 1 is set effective, control portion 21 determines that authentication is necessary, and moves the process to step S03. If the lock function of mobile phone 1 is set ineffective, it determines that authentication is unnecessary, and moves the process to step S15.

In step S03, control portion 21 determines whether mobile phone 1 is in the enable mode. If mobile phone 1 is in the enable mode, control portion 21 moves the process to step S15, so that mobile phone 1 is held in the enable mode to allow input of successive operations. If mobile phone 1 is in the disable mode, control portion 21 moves the process to step S04.

The process proceeds to step S04 when the lock function of mobile phone 1 is set effective and mobile phone 1 is in the disable mode. In step S04, control portion 21 causes LCD 15 to display an input screen for inputting identification information, and requests the operator to input identification information. In step S05, control portion 21 generates authentication history information including at least the date and time when the input of identification information was requested to the operator, and stores the generated information in the EEPROM of memory 29. This is for recording the fact that there was an input of the operation trying to switch mobile phone 1 from the disable mode to the enable mode. In the case where authentication of the identification information succeeded and extraction of the area including an image recognized as a person from the image data failed, the image data is deleted, as will be described later. Even in such a case, the authentication history information is stored, which allows the owner of mobile phone 1 to be notified of the event of unauthorized operation to mobile phone 1, from the history information including the date and time when the owner did not input his/her own identification information. It also allows the owner to know that the authentication information may have been revealed to another person.

Thereafter, control portion 21 activates camera 12 to pick up an image, and acquires image data output from camera 12 (step S06). It stores the acquired image data in the EEPROM of memory 29 (step S07). While control portion 21 usually causes a shutter sound to be output from the speaker at the same time as activation of camera 12, in step S06, it refrains from outputting the shutter sound from the speaker. This ensures that the image of the face of the person who made the unauthorized operation is picked up without being noticed by the person, and the image data is surely acquired. It is noted that control portion 21 may cause the shutter sound to be output from the speaker as usual at the same time as activation of camera 12, in which case the operator of mobile phone 1 is notified that the image was picked up, which functions as the warning to the operator who is trying to input an unauthorized operation.

In step S08, control portion 21 determines whether identification information has been input. When the operator of mobile phone 1 inputs identification information to operation keys 14, control portion 21 acquires the identification information. Control portion 21 is in a standby mode until it acquires identification information (NO in step S08), and once it acquires the identification information, it determines that the identification information has been input, and moves the process to step S09. In step S09, control portion 21 compares the acquired identification information with authentication information 71 stored in the EEPROM of memory 29 for authentication of the identification information. If the identification information and authentication information 71 match, control portion 21 authenticates the identification information; otherwise, it does not authenticate the identification information.

In step S10, control portion 21 branches the process according to the authentication result. If the authentication succeeded with the identification information authenticated, control portion 21 moves the process to step S12; otherwise, it moves the process to step S16. In step S16, control portion 21 transmits image data 75 stored in the EEPROM of memory 29. More specifically, control portion 21 reads image data 75 and transmission destination information 76 from the EEPROM of memory 29, and generates and transmits an e-mail having image data 75 as its attached data and transmission destination information 76 as its destination. When the image data is transmitted upon failure of authentication, the image data is received at the transmission destination. If the transmission destination information prestored in memory 29 is set, e.g., to an e-mail address other than that assigned to mobile phone 1, mobile phone 1 transmits the image data to that e-mail address. As the e-mail transmitted to the e-mail address prestored in mobile phone 1 is received at a computer other than mobile phone 1, the owner of mobile phone 1 is notified that an unauthorized operation was conducted to mobile phone 1 by another person. Further, since the image data included in the e-mail is the one obtained by picking up an image of the operator of mobile phone 1, the image data may be used to specify the person who made the unauthorized operation to mobile phone 1.

In step S11, control portion 21 extracts an area including an image recognized as a person from the image data acquired in step S06. Then, it erases image data 75 stored in memory 29 in step S07 from memory 29 (step S12). In the case where the authentication succeeded and the area including an image recognized as a person is extracted from the image data, it is highly likely that the person is an authorized operator. In the case where an unauthorized operator inputs identification information with covering the image pickup range of camera 12 for example so that his/her image is not to be picked up by camera 12, the area including an image recognized as a person would not be extracted from the image data. In this case, the image data does not include any information specifying the unauthorized operator. Therefore, when the authentication succeeded, it is unnecessary to store the image data in memory 29, and thus, the unnecessary image data is prevented from being stored in memory 29. This ensures effective use of the storage capacity of memory 29.

In the following step S13, control portion 21 determines whether the area including an image recognized as a person was extracted from the image data in step S11. If so, control portion 21 moves the process to step S14; otherwise, it terminates the processing. When the operator of mobile phone 1 inputs identification information while covering the image pickup range of camera 12 with the hand or the like to prevent his/her image from being picked up by camera 12, even if the input identification information matches authentication information 71, the processing is terminated so as not to inform the operator that the input identification information is the authentic information matching authentication information 71. Further, even if the identification information matching authentication information 71 is input, the processing is terminated without switching the mobile phone to the enable mode, which prevents the processing corresponding to the unauthorized operation from being executed.

In step S14, control portion 21 switches the state of mobile phone 1 from the disable mode to the enable mode. In the following step S15, control portion 21 carries out the processing corresponding to the operation acquired as the operator input to operation keys 14. The processing corresponding to the acquired operation may be access to the personal information including telephone directory data, originating number history, incoming number history, transmitted e-mails, and received e-mails, call originating processing, Internet connection processing, or the like.

As described above, when mobile phone 1 of the present embodiment receives an operation in the state where the lock function is set effective, it performs authentication of the identification information input in response to a request to input identification information, and acquires image data of the operator picked up by camera 12. Even if the identification information is authenticated, if the image of the operator is not picked up by camera 12, mobile phone 1 does not carry out the processing corresponding to the operation. Thus, even if the operator inputs identification information trying to find out the authentication information, if the image is not picked up by camera 12, the operator is not able to determine whether the identification information is authenticated or not. This eliminates the action trying to find out the authentication information. Further, the processing corresponding to the operation is carried out only when the identification information is authenticated and when the area including an image recognized as a person is extracted from the image data obtained by picking up an image of the operator. This restricts the executable processing of mobile phone 1 to the processing based on an operation by the operator who knows the authentication information, and thus prevents unauthorized use of mobile phone 1 by others.

Further, when authentication of the identification information failed, mobile phone 1 transmits image data 75 picked up and output by camera 12, to the e-mail address specified by transmission destination information 76. This allows the owner of mobile phone 1 to be informed of the fact that mobile phone 1 was used by an unauthorized person, and also allows the image data to be used to specify the unauthorized person.

While mobile phone 1 has been described in the above embodiment, the present invention may of course be understood as a method for restricting executable processing by which the processing for restricting executable processing shown in FIG. 4 is carried out by mobile phone 1, or as a program for restricting executable processing which causes mobile phone 1 to carry out the processing for restricting executable processing shown in FIG. 4.

Furthermore, while mobile phone 1 has been configured such that image acquiring portion 55 stores image data 75 in the EEPROM of memory 29, it may also be configured such that an audio signal output from microphone 13 is stored in the EEPROM of memory 29 in addition to image data 75. In this case, when an instruction to transmit the image data is input from mode switching portion 61, image data transmitting portion 63 reads image data 75 and the audio signal from the EEPROM of memory 29, and transmits image data 75 and the audio signal to the destination specified by transmission destination information 76. This enables use of the image and the sound for specification of the unauthorized person.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:
1. An information terminal, comprising:
an accepting module operable to accept an operation by an operator;
a processing execution module operable to execute processing corresponding to said operation in response to said operation accepted by said accepting module;
an identification information requesting module operable to request an input of information of identification information for identification of the operator;

an authentication module operable to perform authentication of the identification information input in response to the request by said identification information requesting module;

an image data acquiring module operable to acquire image data when said identification information requesting module requests an input of the identification information;

an image data storage memory operable to store the image data acquired by said image data acquiring module;

an area extracting module operable to extract an area including an image recognized as a person from said acquired image data; and an enabling module operable to enable execution of processing other than deleting said image data by said processing execution module in the case where a first condition that authentication by said authentication module succeeds and a second condition that said area including an image recognized as a person is extracted from said image data by said area extracting module are both satisfied; and a deleting module operable to delete said image data from said image data storage module when the authentication by said authentication module succeeded, and to prevent deleting when the authentication by said authentication module fails.

2. The information terminal according to claim 1, further comprising:

a history information storage module operable to store history information including at least a date and time in response to a request by said identification information requesting module.

3. The information terminal according to claim 1, wherein the image data acquiring module acquires the image data before authentication is performed by said authentication portion.

4. A method for restricting executable processing carried out in an information terminal, the method comprising the steps of:

accepting an operation by an operator;

in response to said accepted operation, executing processing corresponding to said operation;

requesting an input of identification information;

performing authentication of the identification information input in response to said request;

in the case where an input of identification information is requested in said identification information requesting step, acquiring image data;

storing the acquired image data;

extracting an area including an image recognized as a person from said acquired image data;

enabling execution of processing other than deleting said image data by said processing executing step in the case where a first condition that authentication in said authentication step succeeds and a second condition that said area including an image recognized as a person is extracted from said image data in said area extracting step are both satisfied; and deleting said image data when the authentication succeeded, and preventing deletion of said image data when the authentication fails.

5. A non-transitory computer-readable medium storing instructions thereon for, when executed by a processor, restricting executable processing carried out in an information terminal, the instructions causing the information terminal to execute processing comprising the steps of:

accepting an operation by an operator;

in response to said accepted operation, executing processing corresponding to said operation;

requesting an input of identification information;

performing authentication of the identification information input in response to said request;

in the case where an input of identification information is requested in said identification information requesting step, acquiring image data;

storing the acquired image data;

extracting an area including an image recognized as a person from said acquired image data;

enabling execution of processing other than deleting said image data by said processing executing step in the case where a first condition that authentication in said authentication step succeeds and a second condition that said area including an image recognized as a person is extracted from said image data in said area extracting step are both satisfied; and deleting said image data when the authentication succeeded, and preventing deletion of said image data when the authentication fails.

* * * * *